United States Patent
Lee et al.

(10) Patent No.: US 9,674,843 B2
(45) Date of Patent: Jun. 6, 2017

(54) METHOD AND APPARATUS FOR DETERMINING TRANSMISSION POWER OF PREAMBLE IN WIRELESS COMMUNICATION SYSTEM

(71) Applicant: LG Electronics Inc., Seoul (KR)

(72) Inventors: Hyun Woo Lee, Anyang-si (KR); Hyuk Min Son, Anyang-si (KR); Hye Young Choi, Anyang-si (KR); Seung Hee Han, Anyang-si (KR); Jin Min Kim, Anyang-si (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 15/016,621

(22) Filed: Feb. 5, 2016

(65) Prior Publication Data
US 2016/0157238 A1    Jun. 2, 2016

Related U.S. Application Data

(63) Continuation of application No. 14/130,650, filed as application No. PCT/KR2012/005406 on Jul. 9, 2012, now Pat. No. 9,294,940.
(Continued)

(51) Int. Cl.
*H04W 72/04* (2009.01)
*H04W 52/32* (2009.01)
(Continued)

(52) U.S. Cl.
CPC ......... *H04W 72/0473* (2013.01); *H04L 5/001* (2013.01); *H04W 24/02* (2013.01);
(Continued)

(58) Field of Classification Search
CPC ...... H04L 5/0073; H04L 5/001; H04W 24/02; H04W 74/0833; H04W 52/325;
(Continued)

(56) References Cited

U.S. PATENT DOCUMENTS

| | | | |
|---|---|---|---|
| 9,294,940 B2 * | 3/2016 | Lee | H04W 52/325 |
| 2012/0115532 A1 | 5/2012 | He et al. | 455/522 |

(Continued)

FOREIGN PATENT DOCUMENTS

| | | |
|---|---|---|
| EP | 2712246 A1 | 4/2012 |
| KR | 10-2006-0100451 A | 9/2006 |

(Continued)

OTHER PUBLICATIONS

3GPP Technical Specification (TS) 36.213 version 10.1.0 Release 10; Apr. 2011.*
(Continued)

*Primary Examiner* — Benjamin H Elliott, IV
(74) *Attorney, Agent, or Firm* — Dentons US LLP

(57) ABSTRACT

Provided are a method and an apparatus for determining transmission power of a preamble in a wireless communication system. A terminal estimates secondary cell (SCell) path loss with respect to a downlink (DL) component carrier (CC), which is in a linkage relationship with an uplink (UL) component carrier inside the SCell; decides the transmission power of a physical random access channel (PRACH) preamble based on the SCell path loss that is estimated; and transmits the PRACH preamble to a base station through the UL CC inside the SCell, based on the transmission power that is decided, wherein the SCell and a primary cell (PCell) comprises a carrier aggregation (CA) system, the PCell is a cell from which the terminal performs radio resource control (RRC) connection with the base station, and wherein the Scell is at least one cell from residual cells in the carrier aggregation excluding the PCell.

18 Claims, 11 Drawing Sheets

Related U.S. Application Data

(60) Provisional application No. 61/506,623, filed on Jul. 11, 2011, provisional application No. 61/522,253, filed on Aug. 11, 2011.

(51) Int. Cl.

| | | |
|---|---|---|
| *H04W 24/02* | (2009.01) | |
| *H04W 74/08* | (2009.01) | |
| *H04L 5/00* | (2006.01) | |
| *H04W 24/10* | (2009.01) | |
| *H04W 52/34* | (2009.01) | |
| *H04W 52/24* | (2009.01) | |

(52) U.S. Cl.
CPC ......... *H04W 24/10* (2013.01); *H04W 52/325* (2013.01); *H04W 52/34* (2013.01); *H04W 74/0833* (2013.01); *H04W 52/242* (2013.01)

(58) Field of Classification Search
CPC ... H04W 52/242; H04W 72/04; H04W 52/34; H04W 74/08; H04W 24/10; H04W 52/146

See application file for complete search history.

(56) References Cited

U.S. PATENT DOCUMENTS

| | | | | |
|---|---|---|---|---|
| 2012/0281680 A1* | 11/2012 | Bostrom | ............... | H04L 5/0051 370/336 |
| 2012/0300715 A1 | 11/2012 | Pelletier et al. | ............. | 370/329 |
| 2013/0010711 A1 | 1/2013 | Larsson et al. | ................ | 370/329 |
| 2014/0126530 A1* | 5/2014 | Siomina | ............... | H04W 52/146 370/330 |
| 2014/0133337 A1* | 5/2014 | Lee | ..................... | H04W 52/325 370/252 |
| 2016/0157238 A1* | 6/2016 | Lee | ..................... | H04W 52/325 370/329 |

FOREIGN PATENT DOCUMENTS

| | | | |
|---|---|---|---|
| KR | 10-2010-0105754 A | 9/2010 | |
| KR | 10-2011-0013453 A | 2/2011 | |
| SE | WO 2012173570 A1 * | 12/2012 | ......... H04W 52/146 |
| WO | 2010-032773 A1 | 3/2010 | |

OTHER PUBLICATIONS

"3rd Generation Partnership Project; Technical Specification Group Radio Access Network; Evolved Universal Terrestrial Radio Access (E-UTRA); Physical Channels and Modulation (Release 10)". 3GPP Standard; 3GPP TS 36.211, vol. RAN WGI, No. V10.2.0, Jun. 22, 2011, XP050553380.

R2-113258: 3GPP TSG-RAM WG2 #74:Barcelona, Spain, May 9-13, 2011; InterDigital Communications, "Source for RACH on SCells in LTE CA".

R2-113048: 3GPP TSG-RAN WG2#74: Barcelona, Spain, May 9-13, 2011, Sharp "A Special SCell for CA enhancement".

* cited by examiner

METHOD AND APPARATUS FOR DETERMINING TRANSMISSION POWER OF PREAMBLE IN WIRELESS COMMUNICATION SYSTEM

This application is a Continuation of U.S. application Ser. No. 14/130,650 filed Jan. 2, 2014, which is a National Stage under 35 U.S.C. 371 of International Application No. PCT/KR2012/005406 filed Jul. 9, 2012, which claims the benefit of U.S. Provisional Application No. 61/506,623 filed Jul. 11, 2011 and 61/522,253 filed Aug. 11, 2011, all of which are hereby incorporated by reference in their entirety.

BACKGROUND OF THE INVENTION

Field of the Invention

The present invention relates to wireless communications, and more particularly, to a method and apparatus for determining transmission power of a preamble in a wireless communication system.

Related Art

The next-generation multimedia wireless communication systems which are recently being actively researched are required to process and transmit various pieces of information, such as video and wireless data as well as the initial voice-centered services. The $4^{th}$ generation wireless communication systems which are now being developed subsequently to the $3^{rd}$ generation wireless communication systems are aiming at supporting high-speed data service of downlink 1 Gbps (Gigabits per second) and uplink 500 Mbps (Megabits per second). The object of the wireless communication system is to establish reliable communications between a number of users irrespective of their positions and mobility. However, a wireless channel has abnormal characteristics, such as path loss, noise, a fading phenomenon due to multi-path, inter-symbol interference (ISI), and the Doppler Effect resulting from the mobility of a user equipment. A variety of techniques are being developed in order to overcome the abnormal characteristics of the wireless channel and to increase the reliability of wireless communication.

A carrier aggregation (CA) which supports a plurality of cells may be applied in a 3GPP LTE-A. The CA may be referred to as another name such as a bandwidth aggregation. The CA refers to forming a broadband by collecting one or more carrier having a bandwidth smaller than the broadband when a wireless communication system tries to support the broadband. The carrier which becomes a subject when collecting one or more carrier may use the bandwidth which is used in the existing system for backward compatibility. For example, in 3GPP LTE, the bandwidths of 1.4 MHz, 3 MHz, 5 MHz, 10 MHz, 15 MHz, and 20 MHz are supported, and in 3GPP LTE-A, the broadband of more than 20 MHz may be formed by using only the bandwidth of the 3GPP LTE system. Furthermore, the broadband may be formed by defining a new bandwidth without using the bandwidth of the conventional system as itself.

A random access procedure is a procedure which is performed for a user equipment (UE) to connect to a base station. The UE may perform the random access procedure by transmitting a random access preamble to the base station. When the CA is supported, the UE may perform the random access procedure for a plurality of cells.

When the CA is supported, there is a need for a method for efficiently determining transmission power of the random access preamble in the random access procedure for the plurality of cells.

SUMMARY OF THE INVENTION

The present invention provides a method and apparatus for determining transmission power of a preamble in a wireless communication system. The present invention provides a method for determining transmission power of a physical random access channel (PRACH) preamble in a random access procedure for a secondary cell (SCell) of a user equipment (UE) initialized by an order of a base station. The present invention provides a method of determining transmission power of the PRACH preamble based on a downlink (DL) path loss of the SCell.

In an aspect, a method of determining, by a user equipment (UE), transmission power of a preamble in a wireless communication system is provided. The method includes estimating a secondary cell (Scell) path loss for a downlink (DL) component carrier (CC) which has a linkage with an uplink (UL) component carrier (CC) in a SCell, determining transmission power of a physical random access channel (PRACH) preamble based on the estimated SCell path loss, and transmitting the PRACH preamble to a base station through the UL CC in the SCell based on the determined transmission power. The SCell and a primary cell (PCell) consist of a carrier aggregation (CA), the PCell is a cell where the UE performs radio resource control (RRC) connection with the base station, and the SCell is at least one cell among the remaining cells excluding the PCell in the carrier aggregation.

The DL CC may have a SystemInformationBlockType2 (SIB2) linkage with the UL CC in the SCell.

The transmission power of the PRACH preamble may be determined by an equation $$P_{PRACH} = \min\{P_{CAMX,c}(i), \text{REAMBLE\_RECEIVED\_TARGET\_POWER} + PLc\}[\text{dBm}],$$

wherein $P_{CAMX,c}(i)$ is a transmission power of the UE defined for subframe i of the PCell, and the PLc is the estimated SCell path loss.

The transmission power of the PRACH preamble may be determined based on a difference between a PCell path loss and the estimated SCell path loss.

The transmission power of the PRACH preamble may be determined by an equation $$P_{PRACH} = \min\{P_{CAMX,c}(i) \text{PREAMBLE\_RECEIVED\_TARGET\_POWER} + PLc + PL_{diff}\}[\text{dBm}],$$

wherein $P_{CAMX,c}(i)$ is a transmission power of the UE defined for subframe i of the PCell, the PLc is the estimated SCell path loss, and $PL_{diff}$ is the difference between the PCell path loss and the estimated SCell path loss.

The difference between the PCell path loss and the estimated SCell path loss may be received from the base station.

The difference between the PCell path loss and the estimated SCell path loss may be received from the base station through one of a radio resource control (RRC) layer, a media access control (MAC) layer, and a physical (PHY) layer.

The difference between the PCell path loss and the estimated SCell path loss may be received from the base station through a physical downlink control channel (PDCCH) order.

The difference between the PCell path loss and the estimated SCell path loss may be included in a downlink control information (DCI) format 1A and is received from the base station through the PDCCH order.

The UL CC in the SCell may be a UL extension carrier which cannot operate as a stand-alone carrier.

The DL CC may have a virtual linkage with the UL extension carrier.

The DL CC which has a virtual linkage with the UL extension carrier may be indicated by the base station through a higher layer.

The DL CC which has a virtual linkage with the UL extension carrier may be predetermined.

The PCell may provide at least one of non-access stratum (NAS) mobility information and a security input at the time of RRC establishment, RRC reestablishment or a handover.

In another aspect, a user equipment (UE) for determining transmission power of a preamble in a wireless communication system is provided. The UE includes a radio frequency (RF) unit for transmitting or receiving a radio signal, and a processor which is connected to the RF unit, and configured to estimate a secondary cell (Scell) path loss for a downlink (DL) component carrier (CC) which has a linkage with an uplink (UL) component carrier (CC) in a SCell, determine transmission power of a physical random access channel (PRACH) preamble based on the estimated SCell path loss, and transmit the PRACH preamble to a base station through the UL CC in the SCell based on the determined transmission power. The SCell and a primary cell (PCell) consist of a carrier aggregation (CA), the PCell is a cell where the UE performs radio resource control (RRC) connection with the base station, and the SCell is at least one cell among the remaining cells excluding the PCell in the carrier aggregation.

When a random access procedure for a SCell of a UE is initialized by an order of a base station, transmission power of a PRACH preamble may be effectively determined.

DESCRIPTION OF EXEMPLARY EMBODIMENTS

The following technique may be used for various wireless communication systems such as code division multiple access (CDMA), a frequency division multiple access (FDMA), time division multiple access (TDMA), orthogonal frequency division multiple access (OFDMA), single carrier-frequency division multiple access (SC-FDMA), and the like. The CDMA may be implemented as a radio technology such as universal terrestrial radio access (UTRA) or CDMA2000. The TDMA may be implemented as a radio technology such as a global system for mobile communications (GSM)/general packet radio service (GPRS)/enhanced data rates for GSM evolution (EDGE). The OFDMA may be implemented by a radio technology such as institute of electrical and electronics engineers (IEEE) 802.11 (Wi-Fi), IEEE 802.16 (WiMAX), IEEE 802.20, E-UTRA (Evolved UTRA), and the like. IEEE 802.16m, an evolution of IEEE 802.16e, provides backward compatibility with a system based on IEEE 802.16e. The UTRA is part of a universal mobile telecommunications system (UMTS). $3^{rd}$ generation partnership project (3GPP) long term evolution (LTE) is part of an evolved UMTS (E-UMTS) using the E-UTRA, which employs the OFDMA in downlink and the SC-FDMA in uplink. LTE-advanced (LTE-A) is an evolution of 3GPP LTE.

Hereinafter, for clarification, LTE-A will be largely described, but the technical concept of the present invention is not meant to be limited thereto.

Figure 1:
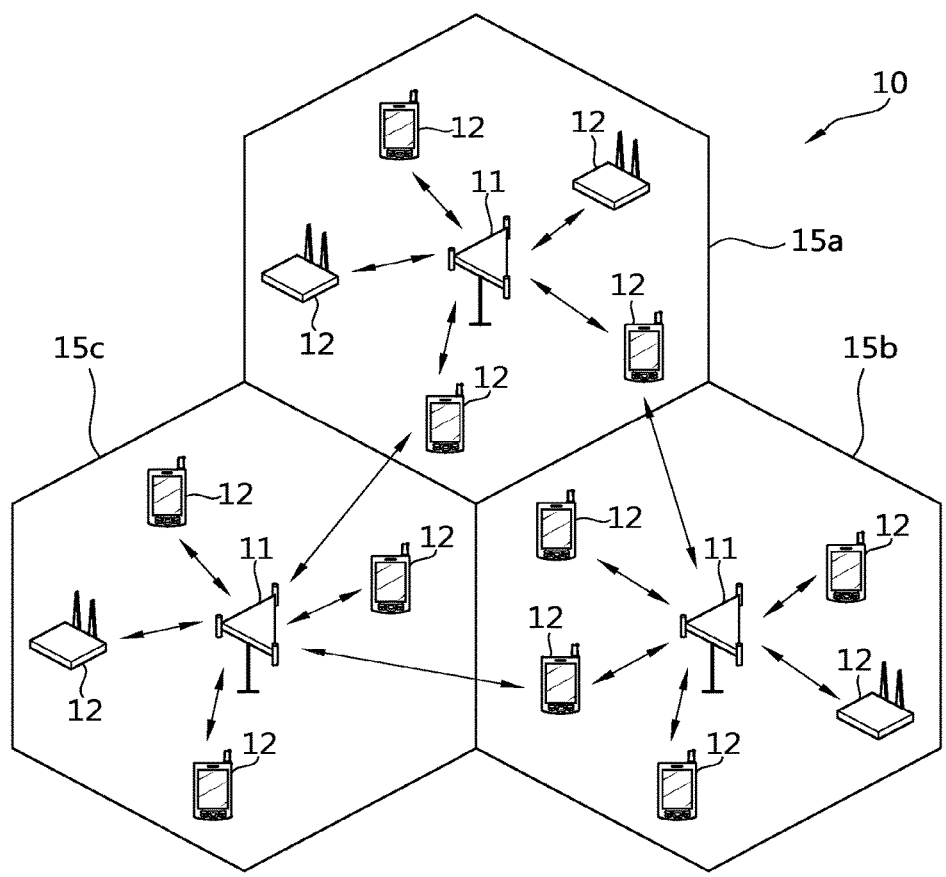
FIG. 1 shows a wireless communication system.

FIG. 1 shows a wireless communication system.

The wireless communication system 10 includes at least one base station (BS) 11. Respective BSs 11 provide a communication service to particular geographical areas 15a, 15b, and 15c (which are generally called cells). Each cell may be divided into a plurality of areas (which are called sectors). A user equipment (UE) 12 may be fixed or mobile and may be referred to by other names such as mobile station (MS), mobile terminal (MT), user terminal (UT), subscriber station (SS), wireless device, personal digital assistant (PDA), wireless modem, handheld device. The BS 11 generally refers to a fixed station that communicates with the UE 12 and may be called by other names such as evolved-NodeB (eNB), base transceiver system (BTS), access point (AP), etc.

In general, a UE belongs to one cell, and the cell to which a UE belongs is called a serving cell. A BS providing a communication service to the serving cell is called a serving BS. The wireless communication system is a cellular system, so a different cell adjacent to the serving cell exists. The different cell adjacent to the serving cell is called a neighbor cell. A BS providing a communication service to the neighbor cell is called a neighbor BS. The serving cell and the neighbor cell are relatively determined based on a UE.

This technique can be used for downlink or uplink. In general, downlink refers to communication from the BS 11 to the UE 12, and uplink refers to communication from the UE 12 to the BS 11. In downlink, a transmitter may be part of the BS 11 and a receiver may be part of the UE 12. In uplink, a transmitter may be part of the UE 12 and a receiver may be part of the BS 11.

The wireless communication system may be any one of a multiple-input multiple-output (MIMO) system, a multiple-input single-output (MISO) system, a single-input single-output (SISO) system, and a single-input multiple-output (SIMO) system. The MIMO system uses a plurality of transmission antennas and a plurality of reception antennas. The MISO system uses a plurality of transmission antennas and a single reception antenna. The SISO system uses a single transmission antenna and a single reception antenna. The SIMO system uses a single transmission antenna and a plurality of reception antennas. Hereinafter, a transmission antenna refers to a physical or logical antenna used for transmitting a signal or a stream, and a reception antenna refers to a physical or logical antenna used for receiving a signal or a stream.

Figure 2:
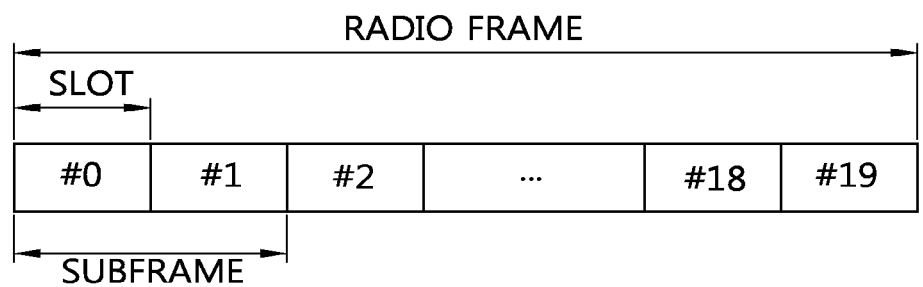
FIG. 2 shows the structure of a radio frame in 3GPP LTE.

FIG. 2 shows the structure of a radio frame in 3GPP LTE.

It may be referred to Paragraph 5 of "Technical Specification Group Radio Access Network; Evolved Universal Terrestrial Radio Access (E-UTRA); Physical channels and modulation (Release 8)" to 3GPP (3rd generation partnership project) TS 36.211 V8.2.0 (2008-03). Referring to FIG. 2, the radio frame includes 10 subframes, and one subframe includes two slots. The slots in the radio frame are numbered by #0 to #19. A time taken for transmitting one subframe is called a transmission time interval (TTI). The TTI may be a scheduling unit for a data transmission. For example, a radio frame may have a length of 10 ms, a subframe may have a length of 1 ms, and a slot may have a length of 0.5 ms.

One slot includes a plurality of orthogonal frequency division multiplexing (OFDM) symbols in a time domain and a plurality of subcarriers in a frequency domain. Since 3GPP LTE uses OFDMA in downlink, the OFDM symbols are used to express a symbol period. The OFDM symbols may be called by other names depending on a multiple-access scheme. For example, when SC-FDMA is in use as an uplink multi-access scheme, the OFDM symbols may be called SC-FDMA symbols. A resource block (RB), a resource allocation unit, includes a plurality of continuous subcarriers in a slot. The structure of the radio frame is merely an example. Namely, the number of subframes included in a radio frame, the number of slots included in a subframe, or the number of OFDM symbols included in a slot may vary.

3GPP LTE defines that one slot includes seven OFDM symbols in a normal cyclic prefix (CP) and one slot includes six OFDM symbols in an extended CP.

The wireless communication system may be divided into a frequency division duplex (FDD) scheme and a time division duplex (TDD) scheme. According to the FDD scheme, an uplink transmission and a downlink transmission are made at different frequency bands. According to the TDD scheme, an uplink transmission and a downlink transmission are made during different periods of time at the same frequency band. A channel response of the TDD scheme is substantially reciprocal. This means that a downlink channel response and an uplink channel response are almost the same in a given frequency band. Thus, the TDD-based wireless communication system is advantageous in that the downlink channel response can be obtained from the uplink channel response. In the TDD scheme, the entire frequency band is time-divided for uplink and downlink transmissions, so a downlink transmission by the BS and an uplink transmission by the UE can be simultaneously performed. In a TDD system in which an uplink transmission and a downlink transmission are discriminated in units of subframes, the uplink transmission and the downlink transmission are performed in different subframes.

Figure 3:
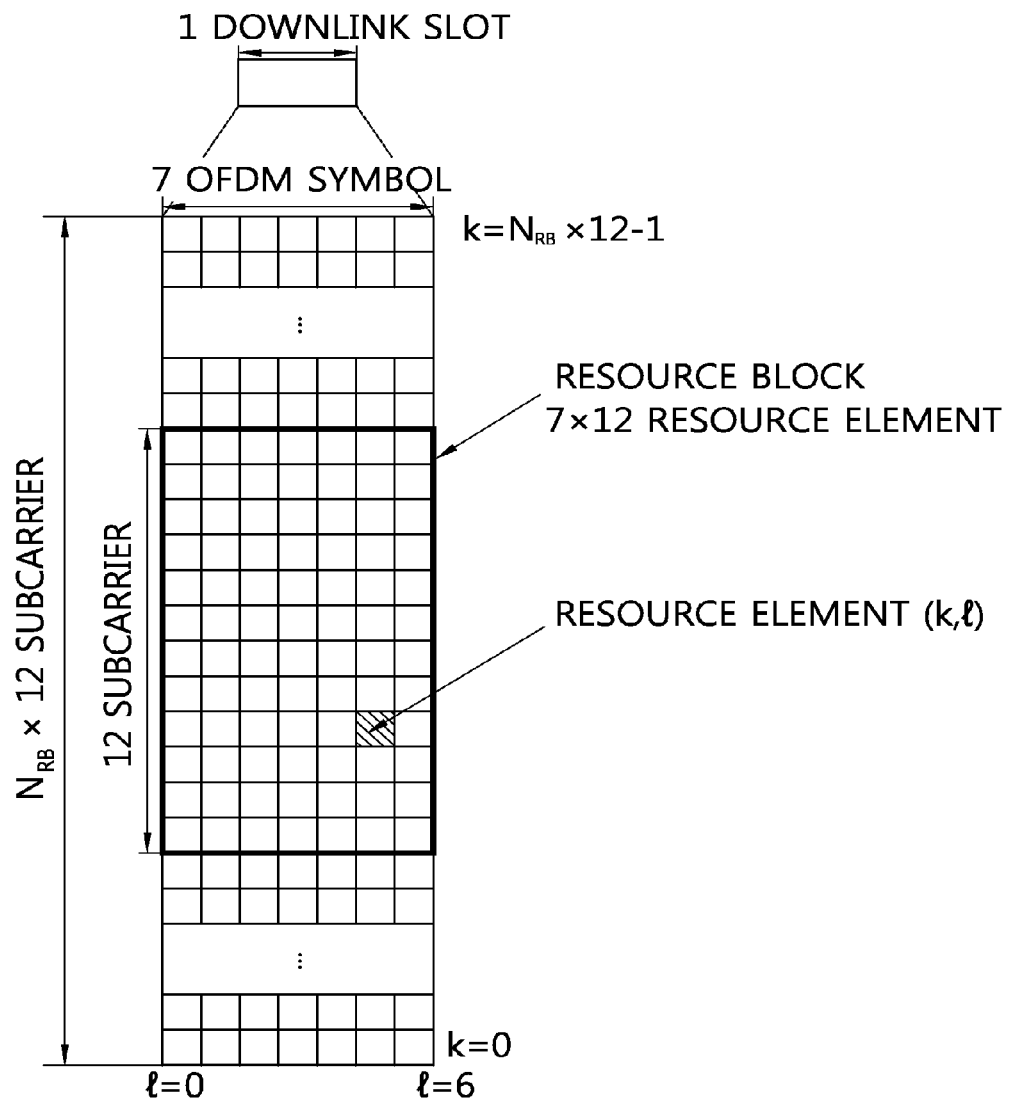
FIG. 3 shows an example of a resource grid of a single downlink slot.

FIG. 3 shows an example of a resource grid of a single downlink slot.

A downlink slot includes a plurality of OFDM symbols in the time domain and $N_{RB}$ number of resource blocks (RBs) in the frequency domain. The $N_{RB}$ number of resource blocks included in the downlink slot is dependent upon a downlink transmission bandwidth set in a cell. For example, in an LTE system, $N_{RB}$ may be any one of 60 to 110. One resource block includes a plurality of subcarriers in the frequency domain. An uplink slot may have the same structure as that of the downlink slot.

Each element on the resource grid is called a resource element. The resource elements on the resource grid can be discriminated by a pair of indexes (k,l) in the slot. Here, k (k=0, . . . , $N_{RB} \times 12-1$) is a subcarrier index in the frequency domain, and 1 is an OFDM symbol index in the time domain.

Here, it is illustrated that one resource block includes 7×12 resource elements made up of seven OFDM symbols in the time domain and twelve subcarriers in the frequency domain, but the number of OFDM symbols and the number of subcarriers in the resource block are not limited thereto. The number of OFDM symbols and the number of subcarriers may vary depending on the length of a cyclic prefix (CP), frequency spacing, and the like. For example, in case of a normal CP, the number of OFDM symbols is 7, and in case of an extended CP, the number of OFDM symbols is 6. One of 128, 256, 512, 1024, 1536, and 2048 may be selectively used as the number of subcarriers in one OFDM symbol.

Figure 4:
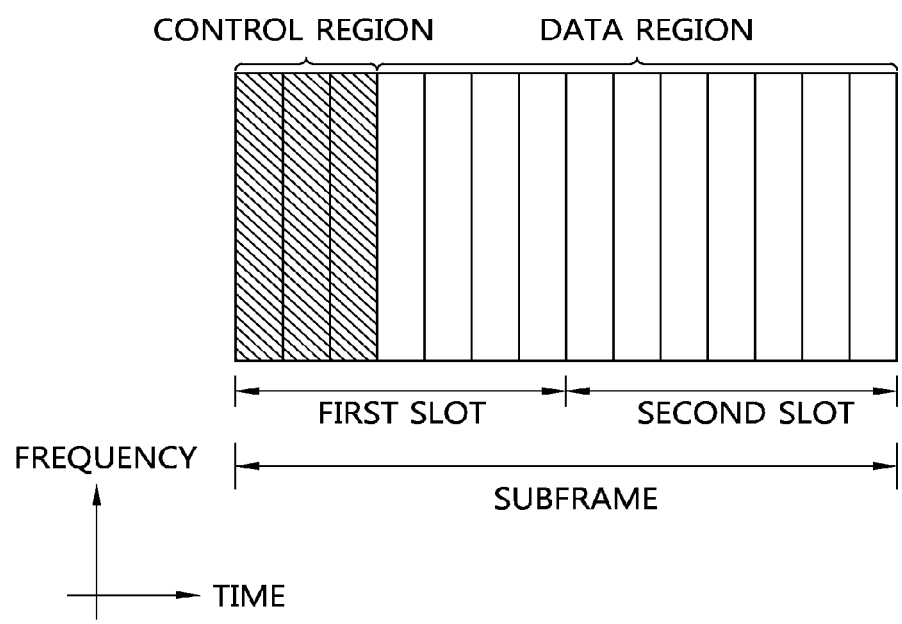
FIG. 4 shows the structure of a downlink subframe.

FIG. 4 shows the structure of a downlink subframe.

A downlink subframe includes two slots in the time domain, and each of the slots includes seven OFDM symbols in the normal CP. First three OFDM symbols (maximum four OFDM symbols with respect to a 1.4 MHz bandwidth) of a first slot in the subframe corresponds to a control region to which control channels are allocated, and the other remaining OFDM symbols correspond to a data region to which a physical downlink shared channel (PDSCH) is allocated.

The PDCCH may carry a transmission format and a resource allocation of a downlink shared channel (DL-SCH), resource allocation information of an uplink shared channel (UL-SCH), paging information on a PCH, system information on a DL-SCH, a resource allocation of an higher layer control message such as a random access response transmitted via a PDSCH, a set of transmission power control commands with respect to individual UEs in a certain UE group, an activation of a voice over internet protocol (VoIP), and the like. A plurality of PDCCHs may be transmitted in the control region, and a UE can monitor a plurality of PDCCHs. The PDCCHs are transmitted on one or an aggregation of a plurality of consecutive control channel elements (CCE). The CCE is a logical allocation unit used to provide a coding rate according to the state of a wireless channel. The CCD corresponds to a plurality of resource element groups. The format of the PDCCH and an available number of bits of the PDCCH are determined according to an associative relation between the number of the CCEs and a coding rate provided by the CCEs.

The BS determines a PDCCH format according to a DCI to be transmitted to the UE, and attaches a cyclic redundancy check (CRC) to the DCI. A unique radio network temporary identifier (RNTI) is masked on the CRC according to the owner or the purpose of the PDCCH. In case of a PDCCH for a particular UE, a unique identifier, e.g., a cell-RNTI (C-RNTI), of the UE, may be masked on the CRC. Or, in case of a PDCCH for a paging message, a paging indication identifier, e.g., a paging-RNTI (P-RNTI), may be masked on the CRC. In case of a PDCCH for a system information block (SIB), a system information identifier, e.g., a system information-RNTI (SI-RNTI), may be masked on the CRC. In order to indicate a random access response, i.e., a response to a transmission of a random access preamble of the UE, a random access-RNTI (RA-RNTI) may be masked on the CRC.

Figure 5:
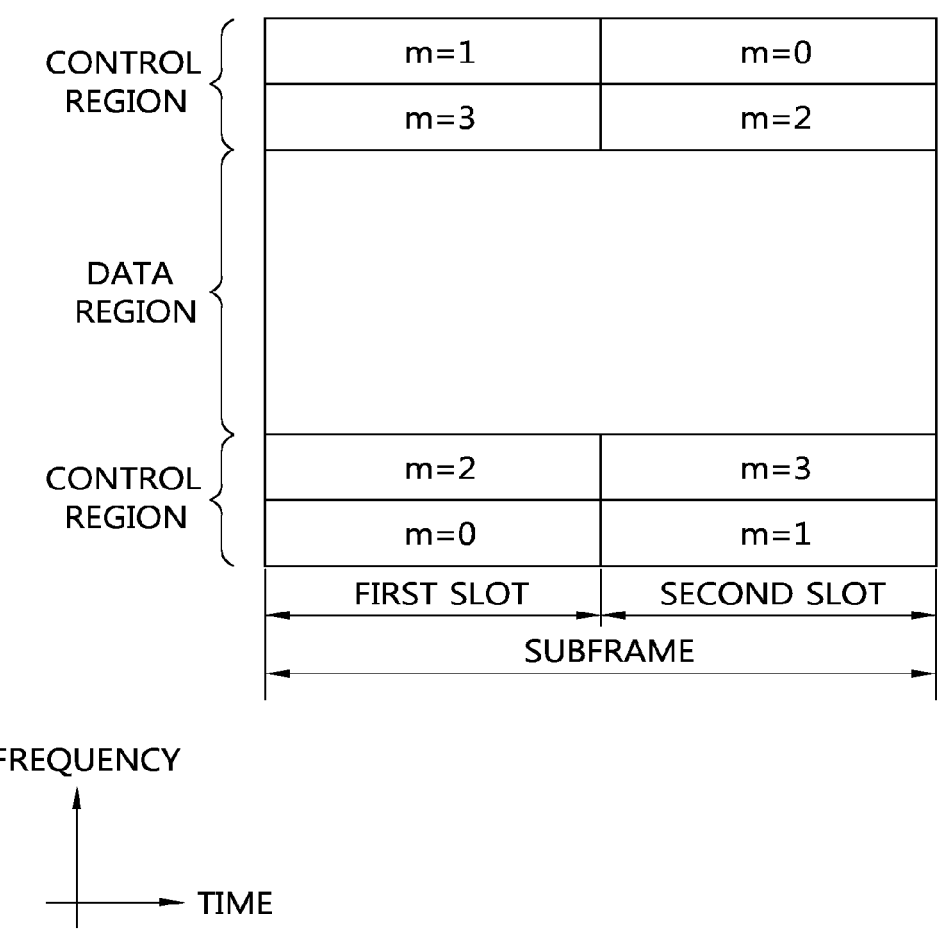
FIG. 5 shows the structure of an uplink subframe.

FIG. 5 shows the structure of an uplink subframe.

An uplink subframe may be divided into a control region and a data region in the frequency domain. A physical uplink control channel (PUCCH) for transmitting uplink control information is allocated to the control region. A physical uplink shared channel (PUCCH) for transmitting data is allocated to the data region. When indicated by a higher layer, the UE may support a simultaneous transmission of the PUSCH and the PUCCH.

The PUCCH with respect to a UE is allocated by a pair of resource blocks in a subframe. The resource blocks belonging to the pair of resource blocks (RBs) occupy different subcarriers in first and second slots, respectively. The frequency occupied by the RBs belonging to the pair of RBs is changed based on a slot boundary. This is said that the pair of RBs allocated to the PUCCH is frequency-hopped at the slot boundary. The UE can obtain a frequency diversity gain by transmitting uplink control information through different subcarriers according to time. In FIG. 5, m is a position index indicating the logical frequency domain positions of the pair of RBs allocated to the PUCCH in the subframe.

Uplink control information transmitted on the PUCCH may include a hybrid automatic repeat request (HARQ) acknowledgement/non-acknowledgement (ACK/NACK), a channel quality indicator (CQI) indicating the state of a downlink channel, a scheduling request (SR), and the like.

The PUSCH is mapped to an uplink shared channel (UL-SCH), a transport channel. Uplink data transmitted on the PUSCH may be a transport block, a data block for the UL-SCH transmitted during the TTI. The transport block may be user information. Or, the uplink data may be multiplexed data. The multiplexed data may be data obtained by multiplexing the transport block for the UL-SCH and control information. For example, control information multiplexed to data may include a CQI, a precoding matrix indicator (PMI), an HARQ, a rank indicator (RI), or the like. Or the uplink data may include only control information.

In 3GPP LTE-A, a carrier aggregation (CA) which supports a plurality of cells may be applied. A plurality of base stations and UEs may communicate through up to 5 cells. The 5 cells may correspond to the bandwidth of the maximum 100 MHz. That is, the CA environment indicates a case where a specific UE has two or more configured serving cells (hereinafter, referred to as "cell") having different carrier frequencies. The carrier frequency represents the center frequency of a cell.

A cell shows combination of DL resources and optionally UL resources. That is, the cell certainly includes DL resources, and the UL resources combined with the DL resources may be optionally included. The DL resources may be a DL component carrier (CC). The UL resources may be a UL CC. When a specific UE includes one configured serving cell, the UE may include one DL CC and one UL CC. When a specific UE includes two or more cells, the UE may include DL CCs whose number is the same as the number of cells and UL CCs whose number is the same as or smaller than the number of cells. That is, when CA is supported in the current 3GPP LTE-A, the number of DL CCs may always be the same as or greater than the number of UL CCs. However, in the release after 3GPP LTE-A, a CA where the number of DL CCs is smaller than the number of UL CCs may be supported.

The linkage between the carrier frequency of the DL CC and the carrier frequency of the UL CC may be indicated by system information transmitted on the DL CC. The system information may be a system information block type 2 (SIB2).

The UE which supports the CA may use a primary cell (PCell) and one or more secondary cells (SCell) for an increased bandwidth. That is, when there are two or more cells, one cell becomes a PCell, and the other cells become SCells. Both the PCell and the SCell may become a serving cell. The UE in the RRC_CONNECTED state where the CA is not supported or cannot be supported may have only one serving cell including only the PCell. The UE in the RRC_CONNECTED state which supports the CA may have one or more serving cells including the PCell and all SCells. Meanwhile, in the TDD system, the UL-DL configuration of all cells may be the same.

The PCell may be a cell which operates in a primary frequency. The PCell may be a cell where the UE performs radio resource control (RRC) connection with a network. The PCell may be a cell whose cell index is the smallest. The PCell may be a cell which tries a random access through a physical random access channel (PRACH) firstly among a plurality of cells. The PCell may be a cell where the UE performs an initial connection establishment process or a connection re-establishment process in a CA environment. Furthermore, the PCell may be a cell which is indicated in a handover process. The UE may obtain non-access stratum (NAS) mobility information (e.g., a tracking area indicator (TAI)) at the time of a RRC connection/reestablishment/handover through the PCell. Furthermore, the UE may obtain a security input at the time of RRC reestablishment/handover through the PCell. The UE may be allocated and transmit a PUCCH only in the PCell. Furthermore, the UE may apply system information acquisition and system information change monitoring only for the PCell. The network may change the PCell of the UE which supports the CA in the handover process by using RRCConnectionReconfiguration message including MobilityControlInfo.

The SCell may be a cell which operates in a secondary frequency. The SCell is used to provide additional wireless resources. The PUCCH is not allocated to the SCell. When adding the SCell, the network provides all system information related with the operation of the related cell in the RRC_CONNECTED state to the UE through dedicated signaling. The change of the system information for the SCell may be performed by a release and addition of the related cell, and the network may independently add, remove, or change the SCell through a RRC connection reestablishment process which uses RRCConnectionReconfiguration message.

The LTE-A UE which supports the CA may simultaneously transmit or receive one or a plurality of CCs depending on the capacity. The LTE rel-8 UE may transmit or receive only one CC when each CC is compatible with the LTE rel-8 system. Hence, when the number of CCs used in the UL is the same as the number of CCs used in the DL, all CCs need to be configured to be compatible with the LTE rel-8. Furthermore, in order to efficiently use a plurality of CCs, a plurality of CCs may be managed in a media access control (MAC). When the CA is formed in the DL, the receiver in the UE should be able to receive a plurality of DL CCs, and when the CA is formed in the UL, the transmitter in the UE should be able to transmit a plurality of UL CCs.

Furthermore, in the LTE-A system, a backward compatible carrier and a non-backward compatible carrier may exist. The backward compatible carrier is a carrier which can be connected to the UE of all LTE releases including LTE rel-8 and LTE-A. The backward compatible carrier may operate as a single carrier or a CC that forms a CA. The backward compatible carrier may be formed always as a pair of DL and UL in a FDD system. In contrast, the non-backward compatible carrier cannot be connected to the UE of the previous LTE release, and may be connected only to the UE of or after the LTE release that defines the carrier. For example, there may be a carrier which can be connected only to a UE of LTE rel-11 and cannot be connected to the UEs of LTE rel-8 to LTE rel-10. The non-backward compatible carrier may operate as a single carrier or as a CC which forms a CA as in the backward compatible carrier.

The extension carrier is a carrier which cannot operate as a single carrier. However, the extension carrier needs to be a CC which forms a CA including at least one carrier which can operate as a single carrier. Hereinafter, the non-backward compatible carrier is referred to as an extension carrier for the convenience of explanation. Generally, in LTE rel-8/9/10, the DL CC and the UL CC in the cell have a SIB2 linkage. For example, if an UL grant is transmitted through a PDCCH which is allocated to the DL CC, the PUSCH is allocated to the UL CC which has a SIB2 linkage with the DL CC. Furthermore, the control channel in the DL and the UL may be performed based on the CC which has a SIB2 linkage. However, if the DL/UL extension carrier is defined, the DL/UL extension carrier does not have a UL/DL CC which has a SIB2 linkage.

As a CA environment is introduced, cross carrier scheduling may be applied. Through the cross carrier scheduling, the PDCCH on a specific DL CC may schedule the PDSCH on one DL CC among a plurality of DL CCs or schedule the PUSCH on one UL CC among a plurality of UL CCs. A carrier indicator field (CIF) may be defined for the cross carrier scheduling. The CIF may be included in the DCI format which is transmitted on the PDCCH. Whether the CIF exists within the DCI format may be indicated by the higher layer semi-statically or UE-specifically. When the cross carrier scheduling is performed, the CIF may indicate the DL CC where the PDSCH is scheduled or the UL CC where the PUSCH is scheduled. The CIF may be fixed three bits, and may exist in a fixed position regardless of the DCI format size. When the CIF does not exist within the DCI format, the PDCCH on a specific DL CC may schedule the PDSCH on the same DL CC or schedule the PUSCH on the UL CC which has a SIB2 linkage with the specific DL CC.

When the cross carrier scheduling is performed using the CIF, the base station may allocate the PDCCH monitoring DL CC aggregation in order to reduce complexity of the blind decoding of the UE. The PDCCH monitoring DL CC aggregation is a part of the whole DL CC, and the UE performs blind decoding only for the PDCCH within the PDCCH monitoring DL CC aggregation. That is, in order to schedule the PDSCH and/or PUSCH for the UE, the base station may transmit the PDCCH only through the DL CC in the PDCCH monitoring DL CC aggregation. The PDCCH monitoring DL CC aggregation may be set UE-specifically, UE-group-specifically or cell-specifically.

Figure 6:
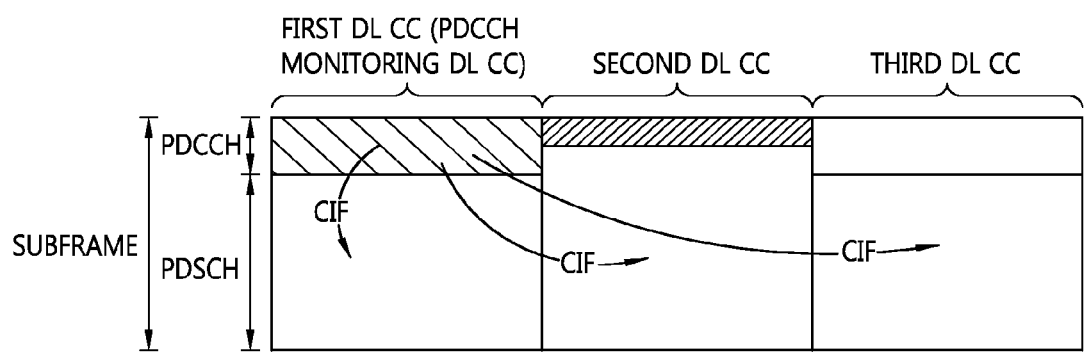
FIG. 6 shows an example of a subframe structure of 3GPP LTE-A system which is cross-carrier-scheduled through CIF.

FIG. 6 shows an example of a subframe structure of 3GPP LTE-A system which is cross-carrier-scheduled through CIF.

Referring to FIG. 6, a first DL CC among three DL CCs is set as a PDCCH monitoring DL CC. When the cross carrier scheduling is not performed, each DL CC schedules PDSCH by transmitting each PDCCH. When the cross carrier scheduling is performed, only the first DL CC which is set as the PDCCH monitoring DL CC transmits the PDCCH. The PDCCH which is transmitted on the first DL CC schedules the PDSCH of the second DL CC and the third DL CC by using CIF as well as the PDSCH of the first DL CC. The second DL CC and the third DL CC which are not set as the PDCCH monitoring DL CC do not transmit PDCCH.

Furthermore, the cross carrier scheduling is not supported in the PCell. That is, the PCell is always scheduled by its own PDCCH. The UL grant and DL assignment of the cell is always scheduled from the same cell. That is, if the DL in the cell is scheduled on the second carrier, the UL is also scheduled on the second carrier. The PDCCH order may be transmitted only on the PCell. Furthermore, frame timing, a super frame number (SFN) timing, etc. may be aligned in the aggregated cells.

Furthermore, the UE may transmit uplink control information such as an ACK/NACK signal and channel state information (CSI) which are received, detected, or measured from one or more DL CCs, to the base station through one predetermined UL CC. For example, when the UE needs to transmit an ACK/NACK signal for data which is received from DL CCs of PCell and SCells, the UE may transmit a plurality of ACK/NACK signals for the data received from each DL CC to the base station through the PUCCH of the UL CC of the PCell by multiplexing or bundling the ACK/NACK signals.

When supporting the CA, the intra-band CA and the inter-band CA may be considered. Generally, the intra-band CA is first considered. At this time, the band refers to an operating bandwidth, and is defined as a frequency range where the system operates. Table 1 represents an example of an operating bandwidth which is used in 3GPP LTE. Table 5.5-1 of 3GPP TS 36.104 V10.0.0 may be referenced.

TABLE 1

| E-UTRA Operating bandwidth | UL operating bandwidth $F_{UL\_low}$-$F_{UL\_high}$ | DL operating bandwidth $F_{DL\_low}$-$F_{DL\_high}$ | Duplex mode |
|---|---|---|---|
| 1 | 1920 MHz-1980 MHz | 2110 MHz-2170 MHz | FDD |
| 2 | 1850 MHz-1910 MHz | 1930 MHz-1990 MHz | FDD |
| 3 | 1710 MHz-1785 MHz | 1805 MHz-1880 MHz | FDD |
| 4 | 1710 MHz-1755 MHz | 2110 MHz-2155 MHz | FDD |
| 5 | 824 MHz-849 MHz | 869 MHz-894 MHz | FDD |
| 6 | 830 MHz-840 MHz | 875 MHz-885 MHz | FDD |
| 7 | 2500 MHz-2570 MHz | 2620 MHz-2690 MHz | FDD |
| 8 | 880 MHz-915 MHz | 925 MHz-960 MHz | FDD |
| 9 | 1749.9 MHz-1784.9 MHz | 1844.9 MHz-1879.9 MHz | FDD |
| 10 | 1710 MHz-1770 MHz | 2110 MHz-2170 MHz | FDD |
| 11 | 1427.9 MHz-1447.9 MHz | 1475.9 MHz-1495.9 MHz | FDD |
| 12 | 698 MHz-716 MHz | 728 MHz-746 MHz | FDD |
| 13 | 777 MHz-787 MHz | 746 MHz-756 MHz | FDD |
| 14 | 788 MHz-798 MHz | 758 MHz-768 MHz | FDD |
| 15 | Reserved | Reserved | FDD |
| 16 | Reserved | Reserved | FDD |
| 17 | 704 MHz-716 MHz | 734 MHz-746 MHz | FDD |
| 18 | 815 MHz-830 MHz | 860 MHz-875 MHz | FDD |
| 19 | 830 MHz-845 MHz | 875 MHz-890 MHz | FDD |
| 20 | 832 MHz-862 MHz | 791 MHz-821 MHz | |
| 21 | 1447.9 MHz-1462.9 MHz | 1495.9 MHz-1510.9 MHz | FDD |
| ... | | | |
| 33 | 1900 MHz-1920 MHz | 1900 MHz-1920 MHz | TDD |
| 34 | 2010 MHz-2025 MHz | 2010 MHz-2025 MHz | TDD |
| 35 | 1850 MHz-1910 MHz | 1850 MHz-1910 MHz | TDD |
| 36 | 1930 MHz-1990 MHz | 1930 MHz-1990 MHz | TDD |
| 37 | 1910 MHz-1930 MHz | 1910 MHz-1930 MHz | TDD |
| 38 | 2570 MHz-2620 MHz | 2570 MHz-2620 MHz | TDD |
| 39 | 1880 MHz-1920 MHz | 1880 MHz-1920 MHz | TDD |
| 40 | 2300 MHz-2400 MHz | 2300 MHz-2400 MHz | TDD |
| 41 | 2496 MHz-2690 MHz | 2496 MHz-2690 MHz | TDD |

A plurality of DL CCs or UL CCs which form the CA environment in the intra-band CA are placed adjacent to the frequency domain. That is, the plurality of DL CCs or UL CCs which form the CA environment may be positioned within the same operating bandwidth. Hence, each cell in the intra-band CA may be formed under a premise that respective cells have similar electric wave characteristics. At this time, the electric wave characteristics may include a propagation/path delay, a propagation/path loss, and fading channel impact which may be changed according to the frequency or central frequency. A plurality of CCs are positioned within the same operating bandwidth, and thus the UE may obtain the UL transmission timing for the UL CC in the PCell and set the UL transmission timing of the UL CCs in the SCells to be the same as the transmission timing of the obtained PCell. As such, the UL subframe boundary between cells is aligned in the UE in the same manner, and the UE may communicate with the base station in the CA environment through one radio frequency (RF). However, the PRACH transmission timing may be different for each cell.

A plurality of DL CCs or UL CCs which form the CA environment in the inter-band CA may not be positioned adjacent to the frequency domain. A plurality of CCs which form the CA environment may not be positioned adjacent to the frequency domain due to the allocation of remaining frequencies and the reuse of the frequencies which have been used as another usage, etc. For example, when 2 cells form a CA environment, the carrier frequency of one cell is 800 MHz in DL and UL, and the carrier frequency of the other cell may be 2.5 GHz in DL and UL. Furthermore, the carrier frequency of one cell may be 700 MHz in DL and UL, and the carrier frequency of one cell may be 2.1 GHz in DL and 1.7 GHz in UL. In such an inter-band CA environment, it cannot be assumed that electric wave characteristics between respective cells are the same. That is, in the inter-band CA environment, the UL subframe boundaries between cells cannot be aligned in the same manner, and different UL transmission timings may need to be obtained between cells. The UE may communicate with the base station through a plurality of RFs in the inter-band CA environment.

Figure 7:
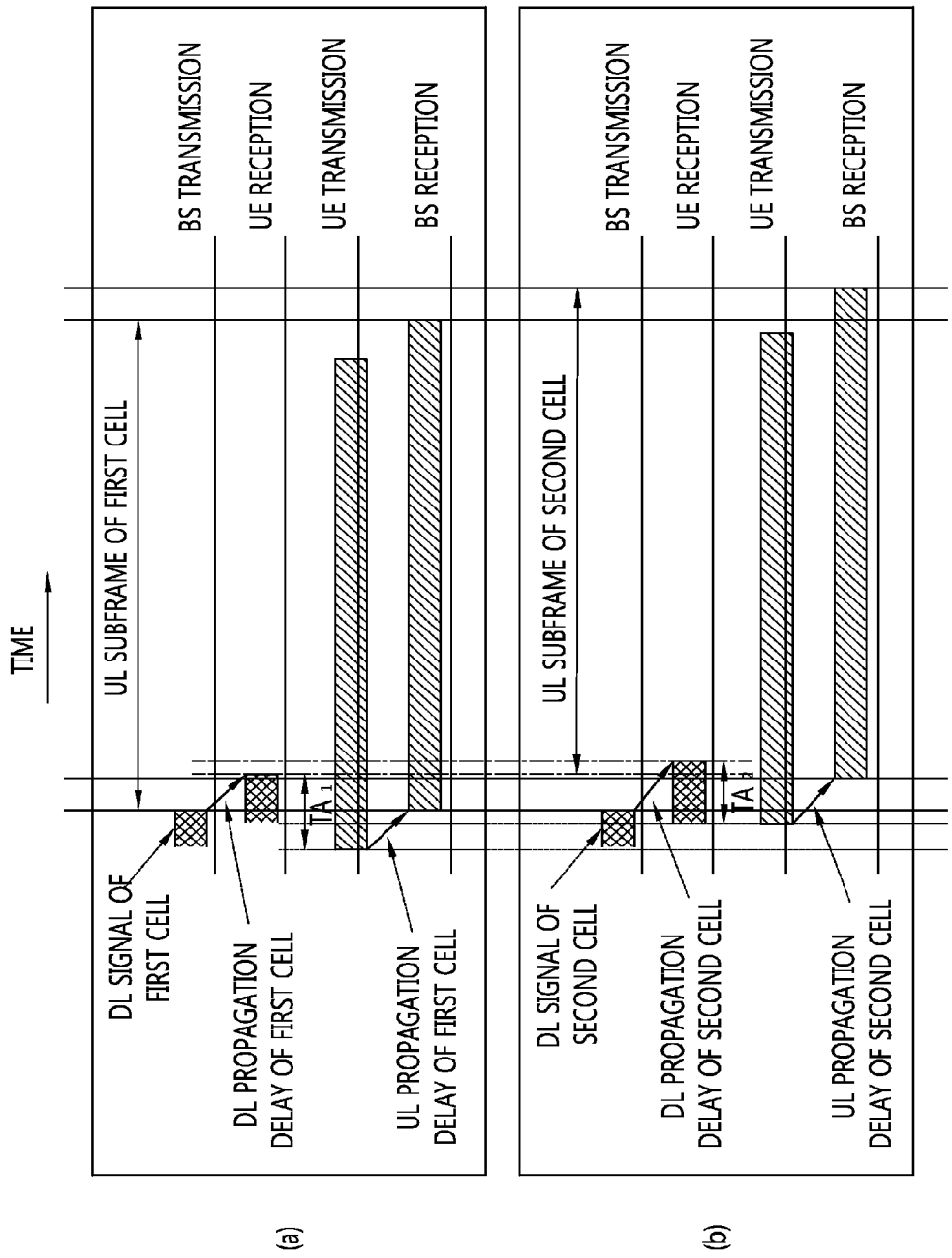
FIG. 7 shows an example where two cells have different UL transmission timings in a CA environment.

FIG. 7 shows an example where two cells have different UL transmission timings in a CA environment.

FIG. 7-(a) shows the UL transmission timing of the first cell, and FIG. 7-(b) shows the UL transmission timing of the second cell. Referring to FIG. 7, the base station transmits the DL signal at the same time point through the first cell and the second cell. The UE receives the DL signal through the first cell and the second cell. At this time, the DL propagation delay of the second cell is greater than the DL propagation delay of the first cell. That is, the DL signal through the second cell is more lately received than the DL signal through the first cell. Respective cells may have different timing advance (TA) values. In FIG. 7, the TA value of the first cell is $TA_1$, and the TA value of the second cell is $TA_2$. Respective cells may have different UL transmission timings. The UL subframe of the first cell and the UL subframe of the second cell are not aligned each other. Each cell needs to perform UL transmission based on different TA values. The current 3GPP LTE-A does not support different UL transmission timings between cells. Furthermore, the UL propagation delay of the second cell is greater than the UL propagation delay of the first cell. It was assumed in FIG. 7 that both DL and UL propagation delays of the second cell are greater than the DL and UL propagation delays of the first cell for the convenience of description, but this is merely an example, and the DL propagation delay may not be proportional to the UL propagation delay.

Hereinafter, a method of efficiently obtaining a plurality of UL transmission timings when the CA is supported is described. The method of obtaining a plurality of UL transmission timings described below may be applied regardless of the UL access scheme. It is assumed below that the UL access scheme is SC-FDMA, but the method may also be applied to the case when the UL access scheme is OFDMA.

1) When a specific SCell has been added by the base station, the random access process for the SCell of the UE may be initialized. That is, if a specific SCell is added, the UE may obtain the UL transmission timing of the SCell.

2) Alternatively, when a specific SCell is activated by the base station, the random access process for the SCell of the UE may be initialized. Even if the SCell is added, the SCell may not be activated and may not be actually used. It is not efficient to obtain and maintain UL transmission timings of such SCell. Hence, the UE may obtain the UL transmission timing of the SCell when a specific SCell is added and activated.

3) Alternatively, the random access process for the SCell of the UE may be initialized by the order of the base station. The base station may order the UE to perform the random access process for the SCell after the SCell is added or the SCell is activated. However, the time point when the base station orders the UE to perform the random access process is not limited thereto. In the description below, for the convenience of description, it is assumed that the base station orders the UE to perform the random access process after the SCell is activated. For example, the order of the base station may be the PDCCH order.

Figure 8:
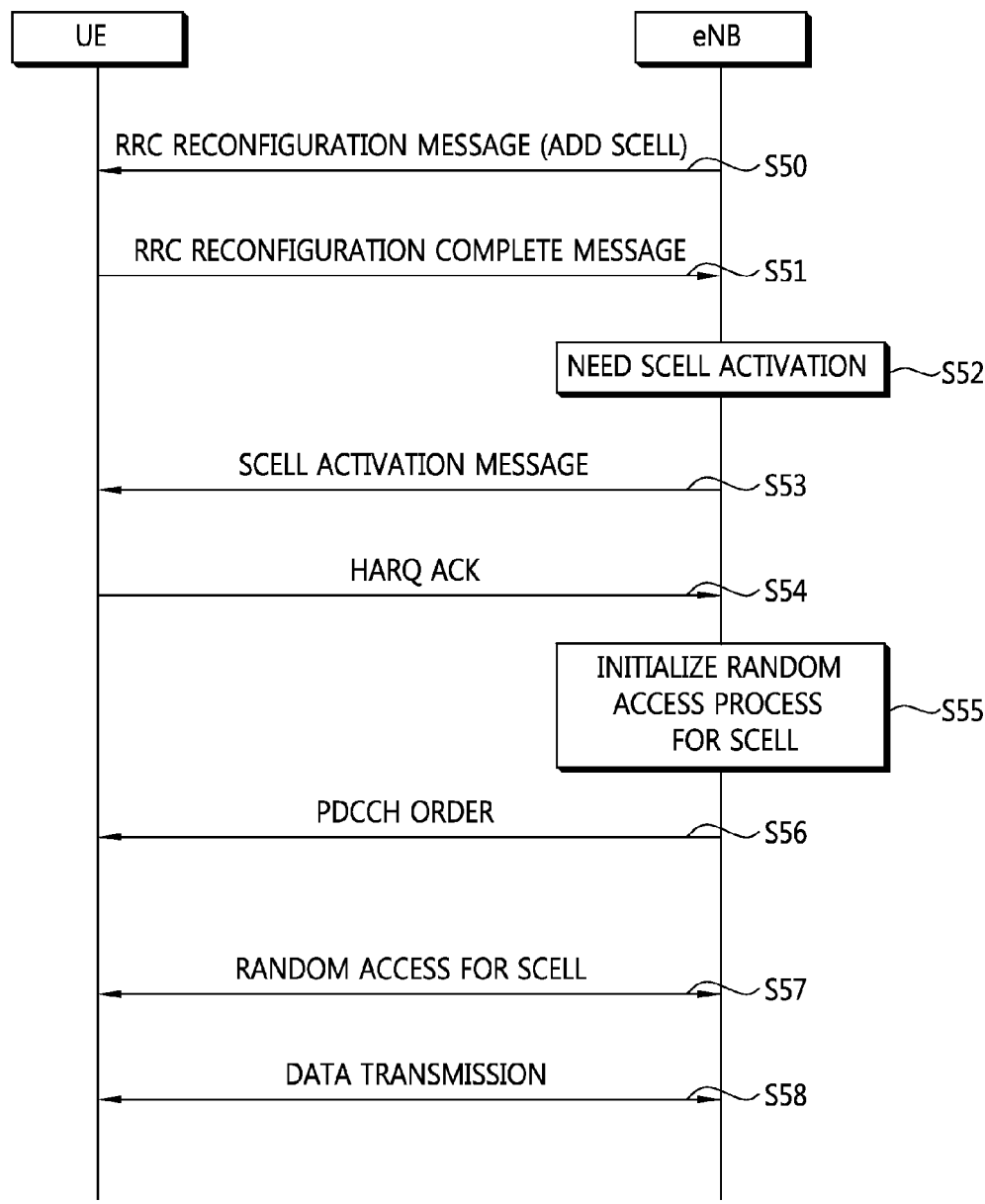
FIG. 8 shows an example of initializing a random access process for a SCell of a UE by an order of a base station.

FIG. 8 shows an example of initializing a random access process for a SCell of a UE by an order of a base station.

Referring to FIG. 8, in step S50, the base station transmits an RRC reconfiguration message to the UE. The SCell may be added by the RRC reconfiguration message. In step S51, the UE transmits the RRC reconfiguration complete message to the base station as a response to the RRC reconfiguration message. In step S52, the base station needs activation of the added SCell. In step S53, the base station transmits a SCell activation message to the UE. In step S54, the UE transmits a HARQ ACK message for the SCell activation message. In step S55, the base station initializes the random access process for the SCell. In step S56, the base station transmits the PDCCH order to the UE. In step S57, the random access process for the SCell between the UE and the base station is performed. In step S58, the UE adjusts the UL transmission timing and transmits data to the base station after completing the random access process.

Meanwhile, in the above description, the SCell may be extended to the extension carrier. That is, in the above description, the SCell may be replaced with an UL extension carrier. When a specific UL extension carrier is added, when the added specific UL extension carrier is activated or by the order of the base station, the random access process for the UL extension carrier of the UE may be initialized. When the random access process for the UL extension carrier of the UE is initialized by the order of the base station, the base station may notify the UE to initialize the random access process in various methods. For example, the base station may notify the UE to initialize the random access process through a specific field within the RRC message used when adding the UL extension carrier or through a separate RRC message. Furthermore, the base station may notify the UE to initialize the random access process through a specific field within the MAC message used when activating the added UL extension carrier or a separate MAC message. Furthermore, whether to cross-carrier-schedule the UL extension carrier may be ordered by the higher layer, or the system may be configured so that the cross carrier scheduling may be always performed without an explicit order.

Figure 9:
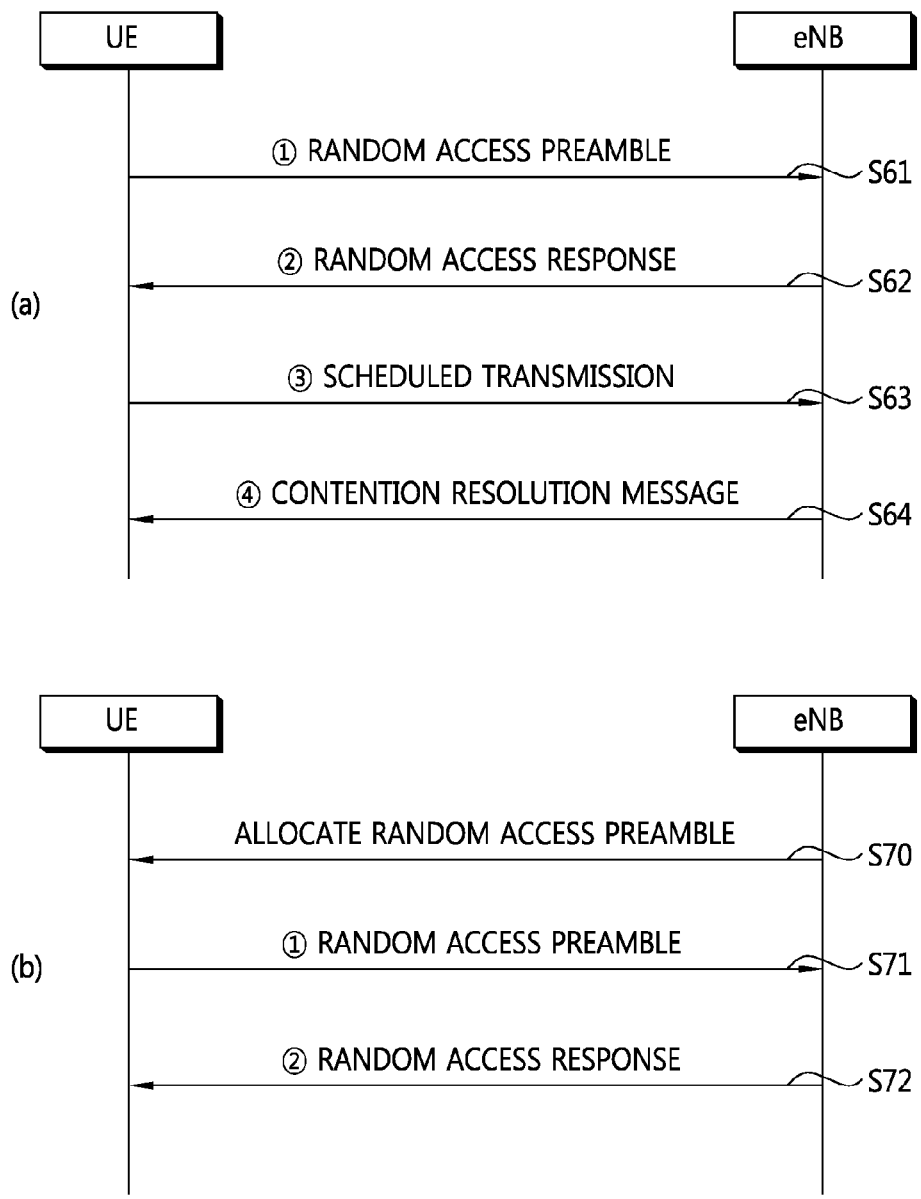
FIG. 9 shows an example of a general random access process.

FIG. 9 shows an example of a general random access process.

The random access process may be divided into a content-based random access process and a non-contention based random access process. The above-described random access process for the SCell may be performed through one or more predetermined methods among two random access processes.

FIG. 9-(a) shows a contention-based random access process. In step S61, the UE transmits a random access preamble to the base station. The random access preamble may be referred to as a PRACH preamble. Furthermore, the random access preamble may be called a first message in the random access process. In step S62, the base station transmits a random access response to the UE as a response to the random access preamble. The random access preamble may be referred to as a RACH response. The random access response may be called a second message in the random access process. In step S63, the UE performs the scheduled transmission to the base station. The scheduled transmission may be called a third message in the random access process. In step S64, the base station transmits the contention resolution message to the UE. The contention resolution message may be called a fourth message in the random access process.

FIG. 9-(b) shows a non-contention based random access process. In step S70, the base station allocates a random access preamble to the UE. In step S71, the UE transmits a first message to the base station. In step S72, the base station transmits a second message to the UE as a response to the first message.

In 3GPP LTE-A rel-10, the random access process is performed only in the PCell, and thus the transmission power of the PRACH preamble may be determined by estimating a path loss of the PCell. Equation 1 below shows an example of an equation for determining transmission power of the PRACH preamble.

$$P_{PRACH}=\min\{P_{CAMX,c}(i), \text{PREAMBLE\_RECEIVED\_TARGET\_POWER}+PLc\}[\text{dBm}] \quad \text{[Equation 1]}$$

In Equation 1, $P_{CAMX,c}(i)$ denotes transmission power of the configured UE which is defined for subframe i of the PCell, and $PL_c$ denotes the estimated DL path loss which is calculated for the PCell in the UE.

As described above, in order to obtain a plurality of UL transmission timings, the random access process may be performed for the SCell. When the random access process is performed for the SCell, a new method for determining the transmission power of the PRACH preamble transmitted in the SCell is required. Hereinafter, a method of determining the transmission power of the PRACH preamble proposed by the present invention is described. In the description below, the contention-based random access process is illustrated, but the present invention is not limited to the example, and the present invention may also be applied to the non-contention-based random access process in the same manner.

1) The transmission power of the PRACH preamble may be determined by estimating the path loss of the SCell where the PRACH preamble is transmitted. That is, the path loss used to determine the transmission power of the PRACH preamble may be a path loss of the DL CC which has a SIB2 linkage with the UL CC in the SCell where the PRACH preamble is transmitted. Equation 2 shows an example of an equation which determines the transmission power of the PRACH preamble according to the proposed method of determining the PRACH preamble transmission power.

$$P_{PRACH}=\min\{P_{CAMX,c}(i), \text{PREAMBLE\_RECEIVED\_TARGET\_POWER}+PLc\}[\text{dBm}] \quad \text{[Equation 2]}$$

Equation 2 may have the same form as that of Equation 1, and $PL_c$ in Equation 2 denotes the estimated value of the DL path loss, which is calculated in the UE, for the DL CC which has a SIB2 linkage with the UL CC in the SCell.

2) The transmission power of the PRACH preamble may be determined by the difference between the path loss of the PCell and the path loss of the SCell where the PRACH preamble is transmitted. Equation 3 shows another example of an equation of determining the transmission power of the PRACH preamble according to the proposed method of determining the transmission power of the PRACH preamble.

$$P_{PRACH}=\min\{P_{CAMX,c}(i), \text{PREAMBLE\_RECEIVED\_TARGET\_POWER}+PLc+PL_{diff}\}[\text{dBm}] \quad \text{[Equation 3]}$$

In Equation 3, $P_{CAMX,c}(i)$ denotes transmission power of the configured UE which is defined for subframe i of the PCell, $PL_c$ denotes the estimated DL path loss calculated in the UE for the PCell, and $PL_{diff}$ denotes a difference between estimated DL path loss values calculated in the UE for the DL CC which has a SIB2 linkage with the UL CC in the PCell and the SCell. $PL_{diff}$ is 0 when the PRACH preamble is transmitted in the PCell.

The base station may signal the difference between the path loss of the PCell and the path loss of the SCell, where the PRACH preamble is transmitted, to the UE, and the UE may determine the transmission power of the PRACH preamble using the difference. The base station may transmit the difference between the path loss of the PCell and the path loss of the SCell to the UE through one of RRC signaling, MAC signal, and PHY signaling. Furthermore, the difference between the path loss of the PCell and the path loss of the SCell may be broadcast or unicast. The base station already serves UEs which support the CA, and thus the UL transmission power between the PCell and a specific SCell may be estimated. Equation 4 below shows another example of an equation which determines the transmission power of the PRACH preamble according to the proposed method of determining the transmission power of the PRACH preamble.

$$P_{PRACH}=\min\{P_{CAMX,c}(i), \text{PREAMBLE\_RECEIVED\_TARGET\_POWER}+PLc+PL_{diff}\}[\text{dBm}] \quad \text{[Equation 4]}$$

In Equation 4, $P_{CAMX,c}(i)$ denotes the transmission power of the configured UE which is defined for subframe i of the PCell, and $PL_c$ denotes the estimated DL path loss calculated in the UE for the PCell, and $PL_{diff}$ denotes a difference between estimated DL path loss values calculated in the UE for the DL CC which has a SIB2 linkage with the UL CC in the PCell and the SCell, which is signaled from the base station. $PL_{diff}$ is 0 when the PRACH preamble is transmitted in the PCell.

Meanwhile, as described above, when the random access process for the SCell is initialized after the activation of the SCell by the order of the base station, the base station may notify the UE of the initialization of the random access process through the PDCCH order. Hence, the base station may signal even the difference between the path loss of the PCell and the path loss of the SCell through the PDCCH order. At this time, the PDCCH order may be transmitted through the PCell and may also be transmitted through the SCell which performs the random access process. The present invention is not limited thereto. The base station may notify the UE of the difference between the path loss of the PCell and the path loss of the SCell using a specific field within the DCI format which is transmitted through PDCCH. The base station already serves UEs which support the CA, and thus the UL transmission power difference between the PCell and a specific SCell may be estimated.

The random access process which is initialized by the PDCCH order in the 3GPP LTE-A is performed through DCI format 1A. The DCI format 1A may refer to Section 5.3.3.1.3 of 3GPP TS 36.212 V10.2.0 (2011-06). When the DCI format 1A is used for the random access process which is initialized by the PDCCH order, the specific fields indicates information for PRACH, and the remaining bits are filled with Os. For example, when the DCI format 1A is used for the random access process which is initialized by the PDCCH order, the DCI format 1A may include such fields as a CIF, a DCI format 0/1A differentiation flag, a localized/distributed virtual RB (VRB) assignment flag, a resource block assignment, a preamble index, and a PRACH mask index, and such fields as a HARQ process number and a DL assignment index may be filled with Os. At this time, the CIF may be included in the DIC format 1A only when the cross carrier scheduling is indicated by the higher layer and the DCI format 1A is transmitted in a UE-specific search space (USS). The CIF is not included in the DCI format 1A when the cross carrier scheduling is not performed and the DCI format 1A is transmitted through the common search space (CSS).

The base station may notify the UE of the difference between the path loss of the PCell and the path loss of the SCell through the DCI format 1A. When the DCI format 1A is used for a random access process which is initialized by the PDCCH order, the remaining bits such as the HARQ process number and the LD allocation index are generated. Likewise, the base station may notify the UE of the difference between the path loss of the PCell and the path loss of the SCell through the remaining bits.

Equation 5 shows another example of an equation which determines the transmission power of the PRACH preamble according to the proposed method of determining the transmission power of the PRACH preamble.

$$P_{PRACH} = \min\{P_{CAMX,c}(i), \text{PREAMBLE\_RECEIVED\_TARGET\_POWER} + PL_c + PL_{diff}\} [\text{dBm}] \quad \text{[Equation 5]}$$

In Equation 5, $P_{CAMX,c}(i)$ denotes the transmission power of the configured UE which is defined for subframe i of the PCell, and $PL_c$ denotes the estimated DL path loss calculated in the UE for the PCell. $PL_{diff}$ denotes a difference between estimated DL path loss values calculated in the UE for the DL CC which has a SIB2 linkage with the UL CC in the PCell and the SCell, which is signaled from the base station by the PDCCH order. $PL_{diff}$ is 0 when the PRACH preamble is transmitted in the PCell. When the DCI format 1A is used for the random access process which is initialized by the PDCCH order, the DCI format 1A may include $PL_{diff}$.

Figure 10:
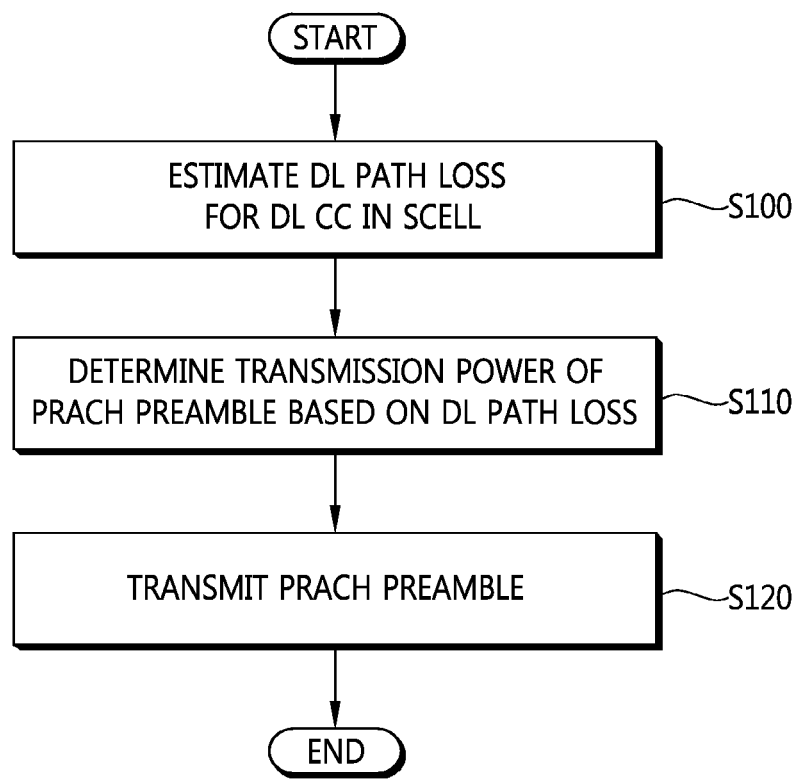
FIG. 10 shows an embodiment of a proposed method of determining transmission power of a preamble.

FIG. 10 shows an embodiment of a proposed method of determining transmission power of a preamble.

Referring to FIG. 10, in step S100, the UE estimates the DL path loss for the DL CC in the SCell. In step S110, the UE determines the transmission power of the PRACH preamble based on the DL path loss. The transmission power of the PRACH preamble may be determined by the above-described Equations 2 to 5. In step S120, the UE transmits the PRACH preamble to the base station based on the determined transmission power.

It was assumed above that the SCell includes only one cell, but this is only for the convenience of description, and the present invention is not limited to this example That is, in the above description, the SCell may be one cell group including one or more cells except the PCell. Likewise, the PCell may also be one cell group including the PCell and another cell.

Furthermore, the method of determining the transmission power of the PRACH preamble is also possible when the UL extension carrier is defined. The UL extension carrier does not have a DL CC which has a SIB2 linkage, and thus in order to determine the transmission power of the PRACH preamble by equations 2 to 5, the DL CC, which is associated with the UL extension carrier in another method, may need to be set. Furthermore, there is no DL CC which has a SIB linkage with the UL extension carrier, and thus always the cross carrier scheduling needs to be performed. Hereinafter, when the UL extension carrier is defined, the method of setting the DL CC associated with the UL extension carrier is described.

1) The DL CC which is virtually linked with the UL extension carrier may be indicated from the base station by the higher layer. The base station may indicate the DL CC which is virtually linked with the UL extension carrier through the RRC signaling or MAC signaling. For example, the physical layer identity including the DL CC which is virtually linked with the UL extension carrier may be indicated through the "PhysCellID" which is the RRC parameter which indicates the physical layer identity of the cell. Furthermore, a new RRC parameter which indicates the DL CC which is virtually linked with the UL extension carrier may be defined. Furthermore, the DL CC which is virtually linked with the UL extension carrier may be indicated through the MAC message or RRC message which activates the UL extension carrier. Furthermore, the DL CC which is virtually linked with the UL extension carrier may be indicated through the MAC message or RRC message which adds or change the UL extension carrier.

The cell group for supporting different UL transmission timings between cells and/or supporting different TDD UL/DL configurations between cells may be defined. When the cell group is defined for the support of different UL transmission timings between cells, the cells which belong to one cell group may have the same UL transmission timing. Furthermore, when the cell group is defined for supporting different TDD UL/DL configurations between cells, the cells which belong to one cell group may include the same TDD UL/DL configuration. Even in such a case, a virtual linkage with the UL extension carrier may be defined.

2) The DL CC which is virtually linked with the UL extension carrier may be always determined by a predetermined rule. For example, the UL extension carrier may be set to always have a virtual linkage with the DL CC in the PCell. Furthermore, the UL extension carrier may be set to be virtually linked with the DL CC in the cell having the smallest index among cells. Furthermore, the UL extension carrier may be set to be virtually linked with the DL CC in the cell having the smallest cell index among the activated cells. Even when the cell group is defined, the DL CC having a definition of a virtual linkage with the UL extension carrier within the cell group may be predetermined.

Figure 11:
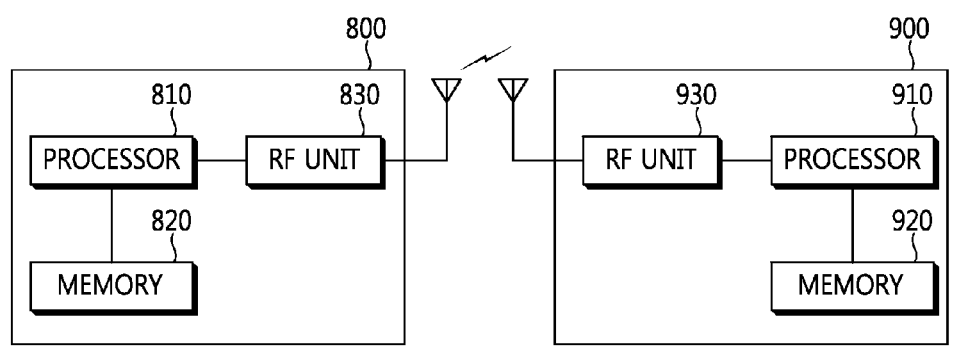
FIG. 11 is a block diagram showing wireless communication system to implement an embodiment of the present invention.

FIG. 11 is a block diagram showing wireless communication system to implement an embodiment of the present invention.

A BS 800 includes a processor 810, a memory 820, and a radio frequency (RF) unit 830. The processor 810 may be configured to implement proposed functions, procedures, and/or methods in this description. Layers of the radio interface protocol may be implemented in the processor 810. The memory 820 is operatively coupled with the processor 810 and stores a variety of information to operate the processor 810. The RF unit 830 is operatively coupled with the processor 810, and transmits and/or receives a radio signal.

A UE 900 may include a processor 910, a memory 920 and a RF unit 930. The processor 910 may be configured to implement proposed functions, procedures and/or methods described in this description. Layers of the radio interface protocol may be implemented in the processor 910. The memory 920 is operatively coupled with the processor 910 and stores a variety of information to operate the processor 910. The RF unit 930 is operatively coupled with the processor 910, and transmits and/or receives a radio signal.

The processors 810, 910 may include application-specific integrated circuit (ASIC), other chipset, logic circuit and/or data processing device. The memories 820, 920 may include read-only memory (ROM), random access memory (RAM), flash memory, memory card, storage medium and/or other storage device. The RF units 830, 930 may include baseband circuitry to process radio frequency signals. When the embodiments are implemented in software, the techniques described herein can be implemented with modules (e.g., procedures, functions, and so on) that perform the functions described herein. The modules can be stored in memories 820, 920 and executed by processors 810, 910. The memories 820, 920 can be implemented within the processors 810, 910 or external to the processors 810, 910 in which case those can be communicatively coupled to the processors 810, 910 via various means as is known in the art.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope and spirit of the present disclosure.

What has been described above includes examples of the various aspects. It is, of course, not possible to describe every conceivable combination of components or methodologies for purposes of describing the various aspects, but one of ordinary skill in the art may recognize that many further combinations and permutations are possible. Accordingly, the subject specification is intended to embrace all such alternations, modifications and variations that fall within the spirit and scope of the appended claims.

What is claimed is:

1. A method for transmitting, by a user equipment (UE), a physical random access channel (PRACH) preamble in a wireless communication system, the method comprising:
    determining a transmission power of the PRACH preamble by using a downlink (DL) pathloss of a secondary cell (SCell) according to equation below:

$$P_{PRACH}=\min\{P_{cmAx,c}(i), \text{PREAMBLE\_RECEIVED\_TARGET\_POWER}+PL_c\}\_[\text{dBm}],$$

where $P_{PRACH}$ denotes the transmission power of the PRACH preamble, $P_{cmAx,c}(i)$ denotes a configured UE transmission power for subframe i of the SCell, PREAMBLE_RECEIVED_TARGET_POWER denotes a target preamble received power, and $PL_c$ denotes the DL pathloss of the SCell; and transmitting the PRACH preamble to a network on an uplink component carrier (UL CC) of the SCell according to the transmission power of the PRACH preamble.

2. The method of claim 1, wherein the SCell belongs to a cell group not containing a primary cell (PCell).

3. The method of claim 2, wherein the cell group further includes one or more SCells.

4. The method of claim 2, wherein an uplink (UL) transmission timing is the same for all cells included in the cell group.

5. The method of claim 1, further comprising calculating the DL pathloss of the SCell on a downlink component carrier (DL CC) of the SCell.

6. The method of claim 1, wherein linkage between a carrier frequency of a DL CC of the SCell and a carrier frequency of a UL CC of the SCell is indicated by system information.

7. The method of claim 6, wherein the system information is a system information block (SIB) type 2.

8. The method of claim 6, wherein the system information is received from the network on a DL CC of the SCell.

9. The method of claim 1, further comprising receiving a request for a random access procedure from the network.

10. A user equipment (UE) in a wireless communication system, the UE comprising:
    a memory;
    a radio frequency (RF) unit; and
    a processor, coupled to the memory and the RF unit, that:
    determines a transmission power of the PRACH preamble by using a downlink (DL) pathloss of a secondary cell (SCell) according to equation below:

$$P_{PRACH}=\min\{P_{cmAx,c}(i), \text{PREAMBLE\_RECEIVED\_TARGET\_POWER}+PL_c\}\_[\text{dBm}],$$

where $P_{PRACH}$ denotes the transmission power of the PRACH preamble, $P_{cmAx,c}(i)$ denotes a configured UE transmission power for subframe i of the SCell, PREAMBLE_RECEIVED_TARGET_POWER denotes a target preamble received power, and $PL_c$ denotes the DL pathloss of the SCell, and
    controls the RF unit to transmit the PRACH preamble to a network on an uplink component carrier (UL CC) of the SCell according to the transmission power of the PRACH preamble.

11. The UE of claim 10, wherein the SCell belongs to a cell group not containing a primary cell (PCell).

12. The UE of claim 11, wherein the cell group further includes one or more SCells.

13. The UE of claim 11, wherein an uplink (UL) transmission timing is the same for all cells included in the cell group.

14. The UE of claim 10, wherein the processor calculates the DL pathloss of the SCell on a downlink component carrier (DL CC) of the SCell.

15. The UE of claim 10, wherein linkage between a carrier frequency of a DL CC of the SCell and a carrier frequency of a UL CC of the SCell is indicated by system information.

16. The UE of claim 15, wherein the system information is a system information block (SIB) type 2.

17. The UE of claim 15, wherein the system information is received from the network on a DL CC of the SCell.

18. The UE of claim 10, wherein the processor further controls the RF unit to receive a request for a random access procedure from the network.

* * * * *